(12) United States Patent
Park et al.

(10) Patent No.: US 10,516,186 B2
(45) Date of Patent: Dec. 24, 2019

(54) NEGATIVE ELECTRODE ACTIVE MATERIAL INCLUDING TITANIUM-BASED COMPOSITE, METHOD OF PREPARING THE SAME AND LITHIUM SECONDARY BATTERY INCLUDING THE SAME

(71) Applicant: LG CHEM, LTD., Seoul (KR)

(72) Inventors: Sung Bin Park, Daejeon (KR); Hye Lim Jeon, Daejeon (KR); Woo Yeon Kong, Daejeon (KR); Wang Mo Jung, Daejeon (KR); Seong Hoon Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/740,531

(22) PCT Filed: Nov. 24, 2016

(86) PCT No.: PCT/KR2016/013611
§ 371 (c)(1),
(2) Date: Dec. 28, 2017

(87) PCT Pub. No.: WO2017/095074
PCT Pub. Date: Jun. 8, 2017

(65) Prior Publication Data
US 2018/0198155 A1 Jul. 12, 2018

(30) Foreign Application Priority Data
Nov. 30, 2015 (KR) .................. 10-2015-0168681

(51) Int. Cl.
*H01M 4/13* (2010.01)
*H01M 10/052* (2010.01)
(Continued)

(52) U.S. Cl.
CPC ........... *H01M 10/052* (2013.01); *H01M 2/16* (2013.01); *H01M 4/131* (2013.01);
(Continued)

(58) Field of Classification Search
CPC ........... H01M 10/052; H01M 10/0569; H01M 10/0585; H01M 2/16; H01M 4/131;
(Continued)

(56) References Cited

U.S. PATENT DOCUMENTS

2003/0064288 A1* 4/2003 Barker ................. C01G 23/003
429/231.1
2003/0073001 A1 4/2003 Barker et al.
(Continued)

FOREIGN PATENT DOCUMENTS

JP 2004-235144 A 8/2004
JP 2011-113796 A 6/2011
(Continued)

OTHER PUBLICATIONS

International Search Report for PCT/KR2016/013611 (PCT/ISA/210) dated Feb. 21, 2017.
(Continued)

*Primary Examiner* — Jane J Rhee
(74) *Attorney, Agent, or Firm* — Birch, Stewart, Kolasch & Birch, LLP

(57) ABSTRACT

The present invention provides a lithium secondary battery, including a positive electrode including a positive electrode active material, a negative electrode including a negative electrode active material, and a separator provided between the positive electrode and the negative electrode, wherein the negative electrode active material may include a titanium-based composite, wherein, when the lithium secondary battery is charged to SOC 50 under C-rate conditions of 0.1 to 40 C, the titanium-based composite has a ratio of the peak area of a plane (400) and the peak area of a plane (111) of 0.76 or more in a measured X-ray diffraction spectrum (XRD). Therefore, the present invention may provide a lithium secondary battery having excellent output characteristics and a battery pack in which a BMS prediction algorithm is simplified.

14 Claims, 2 Drawing Sheets

(51) Int. Cl.
| | |
|---|---|
| H01M 4/62 | (2006.01) |
| H01M 4/36 | (2006.01) |
| H01M 2/16 | (2006.01) |
| H01M 4/131 | (2010.01) |
| H01M 4/1391 | (2010.01) |
| H01M 10/0569 | (2010.01) |
| H01M 10/0585 | (2010.01) |
| H01M 4/485 | (2010.01) |
| H01M 4/02 | (2006.01) |

(52) U.S. Cl.
CPC ......... *H01M 4/1391* (2013.01); *H01M 4/366* (2013.01); *H01M 4/623* (2013.01); *H01M 4/626* (2013.01); *H01M 10/0569* (2013.01); *H01M 10/0585* (2013.01); *H01M 4/485* (2013.01); *H01M 2004/021* (2013.01); *H01M 2004/027* (2013.01); *H01M 2004/028* (2013.01)

(58) Field of Classification Search
CPC .... H01M 4/1391; H01M 4/366; H01M 4/623; H01M 4/626; H01M 4/485; H01M 2004/021; H01M 2004/027; H01M 2004/028
See application file for complete search history.

(56) References Cited

U.S. PATENT DOCUMENTS

| | | | |
|---|---|---|---|
| 2011/0262809 A1 | 10/2011 | Kumagai et al. | |
| 2012/0319034 A1 | 12/2012 | Awano et al. | |
| 2013/0343983 A1* | 12/2013 | Ito | H01M 4/485 423/598 |
| 2014/0295276 A1 | 10/2014 | Takami et al. | |
| 2014/0322609 A1* | 10/2014 | Choi | C01G 23/005 429/231.1 |
| 2015/0180023 A1* | 6/2015 | Xiao | H01M 4/366 429/231 |

FOREIGN PATENT DOCUMENTS

| | | |
|---|---|---|
| JP | 2012-123952 A | 6/2012 |
| JP | 2014-209463 A | 11/2014 |
| JP | 2015-505801 A | 2/2015 |
| KR | 10-2013-0055080 A | 5/2013 |
| KR | 10-2013-0061115 A | 6/2013 |
| KR | 10-2014-0142207 A | 12/2014 |
| WO | WO 2010/052950 A1 | 5/2010 |
| WO | WO 2012/153561 A1 | 11/2012 |

OTHER PUBLICATIONS

Li et al., "A novel spherically porous Zr-doped spinel lithium titanate (Li4Ti5-xZrxO12) for high rate lithium ion batteries", Journal of Alloys and Compounds, 2014, vol. 588, pp. 17-24.
Park et al., "Improving the Electrochemical Properties of Al, Zr Co-doped Li4Ti5O12 as a Lithium-ion Battery Anode Material", Journal of the Korean Physical Society, 2014, vol. 64, pp. 1545-1549.
Shi et al., "Fast microwave-assisted synthesis of Nb-doped Li4Ti5O12 for high-rate lithium-ion batteries", Journal of Nanoparticle Research, 2014, vol. 16, pp. 1-11.
Ahn et at, "Extended lithium titanate cycling potential window with near zero capacity loss," Electrochemistry Communications, vol. 13, 2011 (published online May 14, 2011), pp. 796-799.
Extended European Search Report for European Application No. 16870970.7, dated Dec. 6, 2018.
Sun et al., "Advances in spinel $Li_4Ti_5O_{12}$ anode materials for lithium-ion batteries," New J. Chem., vol. 39, 2015 (published online Oct. 6, 2014), pp. 38-63 (27 pages total).

* cited by examiner

NEGATIVE ELECTRODE ACTIVE MATERIAL INCLUDING TITANIUM-BASED COMPOSITE, METHOD OF PREPARING THE SAME AND LITHIUM SECONDARY BATTERY INCLUDING THE SAME

CROSS-REFERENCE TO RELATED APPLICATION

This application claims priority to and the benefit of Korean Patent Application No. 10-2015-0168681, filed on Nov. 30, 2015, the disclosure of which is incorporated herein by reference in its entirety.

TECHNICAL FIELD

The present invention relates to a negative electrode active material including a titanium-based composite, a method of preparing the same, and a lithium secondary battery to which the negative electrode active material is applied.

BACKGROUND ART

With the recent development of portable devices such as mobile phones, notebook computers, and camcorders, demand for secondary batteries such as nickel-metal hydride (Ni-MH) secondary batteries and lithium secondary batteries is increasing. In particular, a lithium secondary battery using lithium and a non-aqueous solvent electrolyte has a high possibility of producing a battery having a small size, light weight, and high energy density and is being actively developed. In general, in preparation of a lithium secondary battery, transition metal oxides such as $LiCoO_2$, $LiNiO_2$, and $LiMn_2O_4$ are used as positive electrode materials, and lithium metal, carbon, and the like are used as negative electrode materials, and an organic solvent containing lithium ions is used as an electrolyte between the two electrodes.

However, lithium secondary batteries using lithium metal as a negative electrode are liable to generate dendritic crystals with repeated charging and discharging, and as a result, there is a great risk of short-circuiting. Thus, lithium secondary batteries, which use carbonized or graphitized carbon as a negative electrode and a non-aqueous solvent containing lithium ions as an electrolyte, have been put to practical use. However, since carbon-based negative electrode materials have a large irreversible capacity, initial charge/discharge efficiency is low and capacity is reduced. In addition, lithium may be precipitated on the surface of carbon during overcharging, causing problems in safety.

On the other hand, a lithium titanium oxide has recently attracted attention as a negative electrode material used in lithium ion batteries. The lithium titanium oxide has an operating voltage of 1.3 to 1.6 V and a reversible capacity of about 170 mAh/g, which is a higher operating voltage and a lower reversible capacity compared to conventional carbon-based negative electrode materials. These features may be disadvantageous when the lithium titanium oxide is used as a negative electrode material. However, when using the lithium titanium oxide, high-speed charging and discharging is possible, almost no irreversible reaction occurs (initial efficiency of 95% or more), and the heat of reaction is very small, which provides excellent safety. These features may be advantageous when the lithium titanium oxide is used as a negative electrode material. In addition, the theoretical density of carbon materials is as low as about 2 g/cm³, whereas the theoretical density of $Li_4Ti_5O_{12}$, which is a lithium titanium oxide, is as high as about 3.5 g/cm³. Thus, $Li_4Ti_5O_{12}$ has a similar capacity per volume compared to the carbon materials.

Conventionally, lithium titanium oxides are used as high input/output materials in the way that the size of lithium titanium oxide particles is miniaturized to enlarge the active surfaces of the lithium titanium oxide particles, thereby accelerating the diffusion rate of lithium.

DISCLOSURE

Technical Problem

The present invention is directed to providing a titanium-based composite containing a lithium titanium oxide which is doped or coated with specific elements to overcome intrinsic resistance difference due to the structural features of the lithium titanium oxide, providing a lithium secondary battery having excellent output characteristics suitable for automotive batteries requiring high output, and providing a battery pack in which the variation range of the resistance of each secondary battery is small and a battery management system (BMS) prediction algorithm is simplified.

Technical Solution

One aspect of the present invention provides a negative electrode active material for a secondary battery, including a titanium-based composite containing a lithium titanium oxide represented by Formula 1 below; and metal elements doped or coated on the lithium titanium oxide, wherein the metal elements include any one selected from the group consisting of M1, Al and combinations thereof, wherein M1 is at least one transition metal element selected from the group consisting of Zr and Nb.

$$Li_xTi_yO_z, \qquad \text{<Formula 1>}$$

in Formula 1, x, y and z satisfy $0.1 \leq x \leq 4$, $1 \leq y \leq 5$ and $2 \leq z \leq 12$, respectively.

Advantageous Effects

The negative electrode active material of the present invention is a titanium-based composite containing a lithium titanium oxide, which is doped and/or coated with specific metal elements. Since the titanium-based composite has a well-developed crystal plane (400), intrinsic resistance difference due to the structural features of the lithium titanium oxide can be overcome and the variation range of resistance can be reduced. Therefore, the present invention can provide a lithium secondary battery having excellent output characteristics and a battery pack, in which a BMS prediction algorithm is simplified.

BEST MODE

Examples

Figure 1:
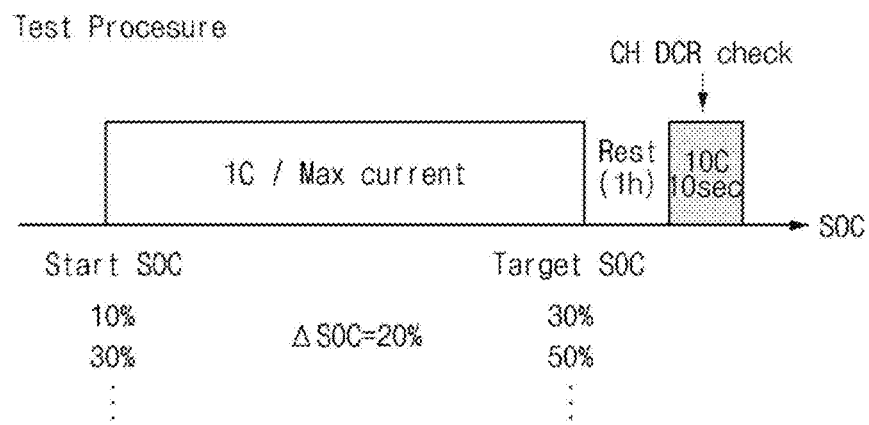
FIG. 1 is a schematic view showing a method of evaluating lithium secondary batteries according to examples and comparative examples of the present invention.

Hereinafter, exemplary embodiments of the present invention are described in detail so as for those of ordinary skill in the art to easily implement with reference to the accompanying drawings. However, the present invention may be implemented in various different forms and is not limited to these embodiments.

Example 1

1) Preparation of Negative Electrode 13.43 g of $LiOH.H_2O$ as a lithium precursor, 31.88 g of $TiO_2$ as a titanium precursor and 0.10 g of $ZrO_2$ as an M1 precursor were poured into a ball mill, and milling was performed for 60 minutes to evenly mix the precursors. As a result, precursor mixture powder was prepared. Next, the precursor mixture powder was charged into a furnace and heat-treated at a temperature of 800° C. for about 10 hours. Then, 0.08 g of $Al_2O_3$ as an Al precursor was added and heat-treated at a temperature of 500° C. for 3 hours to synthesize $Li_4Ti_{4.99}Zr_{0.01}O_{12}/Al_2O_3$, a titanium-based composite, (2000 ppm doping and coating amount).

90% by weight of the synthesized lithium titanium oxide composite, 5% by weight of carbon black as a conductive material, and 5% by weight of PVDF as a binder were mixed to prepare slurry for a negative electrode (20 g base). Then, the slurry was applied to an aluminum thin film having a thickness of about 20 μm and dried to prepare a negative electrode, followed by roll pressing to process the negative electrode.

2) Preparation of Lithium Secondary Battery

A lithium cobalt oxide ($LiCoO_2$) as a positive electrode active material, carbon black as a conductive material, and polyvinylidene fluoride (PVDF) as a binder were added to N-methyl-2-pyrrolidone (NMP) as a solvent to prepare slurry for a positive electrode. Then, the slurry for a positive electrode was applied to an aluminum thin film having a thickness of about 20 μm as a positive electrode current collector and dried to prepare a positive electrode, followed by roll pressing to process the positive electrode.

1 M $LiPF_6$ as a lithium salt was dissolved in a non-aqueous solvent containing ethylene carbonate (EC) and diethyl carbonate (DEC) to prepare an electrolyte. A separator composed of three layers of polypropylene/polyethylene/polypropylene (PP/PE/PP) was prepared. Then, the positive electrode, the negative electrode, and the separator were assembled and the electrolyte was injected to prepare a lithium secondary battery.

Examples 2 to 4

Negative electrode active materials according to Examples 2 to 4 were prepared in the same manner as Example 1 except for using amounts shown in Table 1, instead of using 2000 ppm of the doping and/or coating amount of Zr and Al in Example 1. Then, lithium secondary batteries were prepared using the negative electrode active materials

Comparative Example 1

A negative electrode and a lithium secondary battery were prepared in the same manner as the examples except that 1 g of $ZrO_2$ (1% by weight of doping amount) was added and $Al_2O_3$ coating was not performed.

Comparative Example 2

A negative electrode and a lithium secondary battery were prepared in the same manner as the examples except that $ZrO_2$ was not added and $Al_2O_3$ coating was not performed.

Experimental Example 1

Measurement of Resistance Change Rate Depending on SOC Setting of Lithium Secondary Battery FIG. 1 is a schematic view illustrating a method of evaluating lithium secondary batteries prepared according to the examples and the comparative examples.

Figure 2:
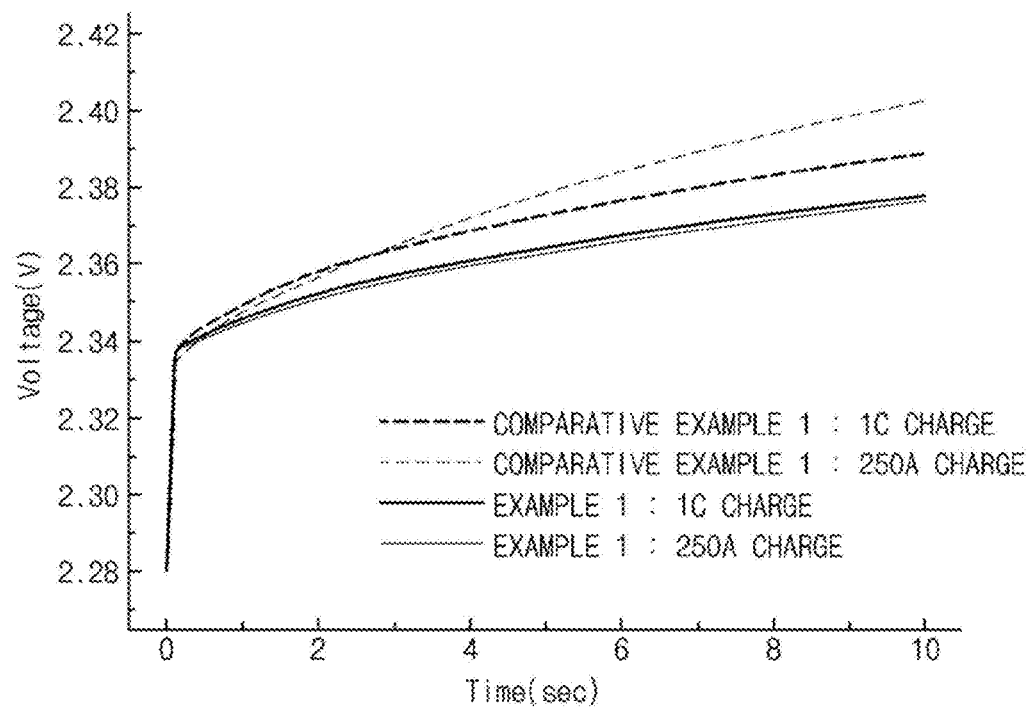
FIG. 2 is a graph showing the results of voltage measurement for secondary batteries according to examples and comparative examples of the present invention, according to the evaluating method of FIG. 1.

A SOC change rate was set to 20%, and when SOC to be measured was reached, batteries were allowed to stand for 1 hour, and the change rates of voltages were measured for 10 seconds while the batteries were charged at 10 C. The results are shown in FIG. 2, and calculated resistance values are shown in Table 1.

Figure 3:
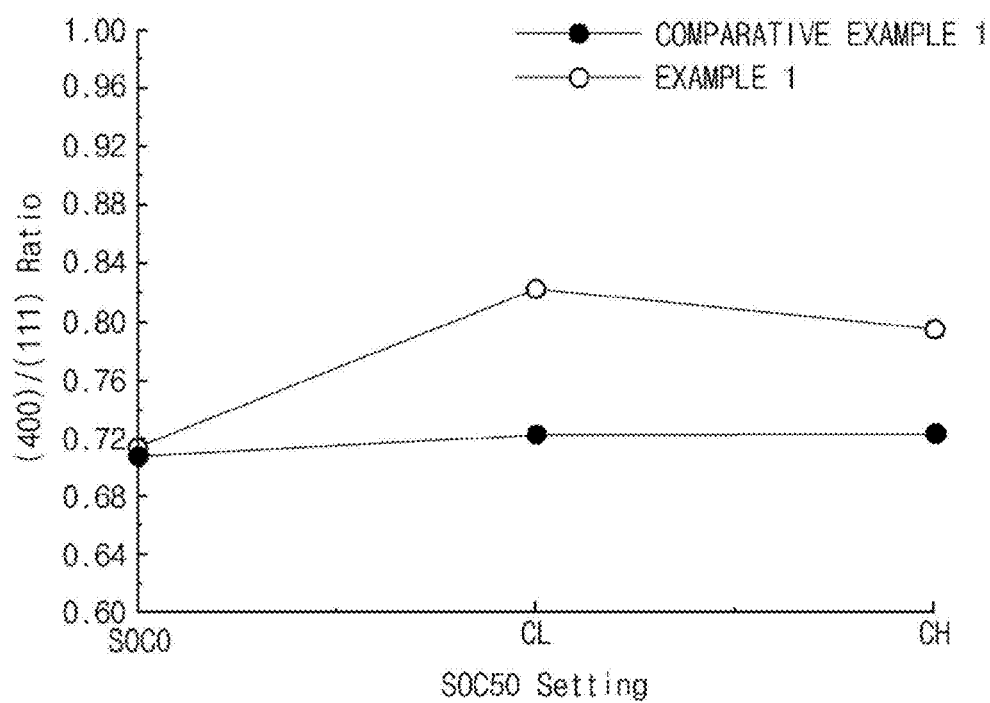
FIG. 3 is a graph showing the area ratio of a crystal plane (400) and a crystal plane (111) based on an X-ray diffraction spectrum measured at SOC 50 during charging lithium secondary batteries according to examples and comparative examples of the present invention.

In addition, after charging the batteries to SOC 50 at a setting of 0.1 to 40 C, X-ray diffraction analysis was performed on the negative electrodes of the examples and the comparative examples, and the ratio of the peak area of a crystal plane (400) and the peak area of a crystal plane (111) was calculated. The results are shown in FIG. 3.

TABLE 1

| | M1 | Al | Doping/Coating amount | 1 C Resistance value (Ω) | 250 A Resistance value (Ω) | Change rate (%) |
|---|---|---|---|---|---|---|
| Example 1 | Zr | Al | 2000 ppm | 0.929 | 0.927 | 0.2 |
| Example 2 | Zr | Al | 1000 ppm | 0.930 | 0.928 | 0.2 |
| Example 3 | Zr | Al | 3000 ppm | 0.933 | 0.930 | 0.3 |
| Example 4 | Nb | Al | 2000 ppm | 0.950 | 0.944 | 0.7 |
| Example 5 | Zr | Al | 300 ppm | 1.102 | 1.100 | 0.1 |
| Example 6 | Zr | Al | 6000 ppm | 1.042 | 1.150 | 10.40 |
| Comparative Example 1 | Zr | x | 10000 ppm | 1.087 | 1.232 | 13.34 |
| Comparative Example 2 | x | x | | Unmeasurable | Unmeasurable | Unmeasurable |
| Comparative Example 3 | x | Al | 3000 ppm | 1.323 | 1.220 | 8.40 |

Referring to Table 1 and FIG. 2, in the cases of Examples 1 to 5, resistance change rates were almost 0% depending on the SOC setting of voltage, whereas in the cases of Comparative Examples 1 to 3, resistance change rates were over 10%, which was significant without deviating from an experimental error range. That is, when a battery pack is prepared using the lithium secondary battery according to the example of the present invention, the resistance change is close to 0% as described above, so that a BMS prediction algorithm may be remarkably simplified. Furthermore, since the batteries of Examples 1 to 6 have resistance values lower than that of the comparative examples, an increase in output may be expected accordingly.

Referring to Examples 1 to 6, it can be confirmed that the characteristics observed in Examples 1 to 4, in which doping/coating amount was adjusted at 700 to 3000 ppm, are better than those observed in Examples 5 and 6. These results indicate that the intended effect of the present invention may be achieved by content control.

Experimental Example 2

Measurement of Area Ratio of Crystal Plane (400) and Crystal Plane (111)

The lithium secondary batteries prepared according to the examples and the comparative examples were charged to SOC 50 at a setting of 0.1 to 40 C, and X-ray diffraction analysis was performed on the negative electrodes of the examples and the comparative examples. Then, the area ratio of the peak area of the crystal plane (400) and the peak area of the crystal plane (111) was calculated. The results are shown in FIG. 3.

Referring to FIG. 3, it can be seen that the plane (400) is developed only in the case of the lithium secondary battery prepared according to the example of the present invention, and the area ratio of the plane (400) and the plane (111) is considerably large (at least 0.76 or more). In addition, considering these results and the resistance change rates in Experimental Example 1, it can be seen that the resistance change rate is close to 0 when the area ratio is 0.76 or more, preferably 0.80 or more.

Therefore, a small resistance change rate and the well-developed crystal plane (400) may be achieved by appropriately adjusting amounts doped and coated with M1 and Al to be not more than 3000 ppm as in the examples. In the case of Comparative Example 1, in which the amounts of coating and doping were excessive, a high resistance change rate was observed due to the fact that the doping and coating using M1 and Al were not properly controlled, making resistance change difficult to predict. Furthermore, in the case of Comparative Example 2, in which no doping and coating using M1 and Al was performed, capacity was not measured and evaluation could not be performed. It can be inferred that performance is further degraded, considering that Example 1 and Comparative Example 1 were evaluated in the same settings.

The preferred embodiments of the present invention have been described in detail above. It should be understood, however, that the scope of the present invention is not limited thereto and that various modifications and improvements made by those skilled in the art using the basic concept of the present invention as defined in the following claims are also within the scope of the present invention.

MODE FOR INVENTION

Hereinafter, the present invention will be described in detail in order to facilitate understanding of the present invention. Also, the meaning of the terms used in the specification and the appended claims should not be construed as being confined to common or dictionary meaning, but should be construed as concepts not departing from the spirit and scope of the present invention in order to describe the present invention in the most appropriate way.

Lithium Secondary Battery Including Titanium-Based Composite as Negative Electrode Active Material According to one embodiment, provided is a lithium secondary battery, including a positive electrode including a positive electrode active material, a negative electrode including a negative electrode active material, and a separator provided between the positive electrode and the negative electrode, wherein the negative electrode active material includes a titanium-based composite, wherein, when the lithium secondary battery is charged to SOC 50 under C-rate conditions of 0.1 to 40 C, the titanium-based composite has a ratio of the peak area of the plane (400) and the peak area of the plane (111) of 0.76 or more in a measured X-ray diffraction spectrum (XRD).

Preferably, the negative electrode active material may include the titanium-based composite, wherein, when the lithium secondary battery is charged to SOC 50 under C-rate conditions of 0.1 to 10 C, the titanium-based composite has a ratio of the peak area of the plane (400) and the peak area of the plane (111) of 0.80 or more in a measured X-ray diffraction spectrum (XRD).

In the measurement of X-ray diffraction spectrum, when SOC is charged to 50 under C-rate conditions of 0.1 to 40 C, the measurement may be performed in a charging direction in the cases of slow charging (0.1 C) and fast charging (40 C). The area ratio may indicate the ratio of the area values of peaks and a specific crystal plane among peaks displayed on the result graph of diffraction spectrum. Particularly, in the present invention, the area values of the plane (400) and the plane (111) among crystal planes are determined and then limited to these ratios.

In general, a negative electrode that may be applied to a high output system secondary battery in place of a carbon-based negative electrode is a negative electrode using a lithium titanium oxide, and during charging and discharging, the lithium titanium oxide performs a two-phase reaction between a spinel structure and a rock-salt structure according to the occlusion and release of lithium. At this time, even when resistances are measured in the same SOC, resistance values may be different depending on directions in which SOC is set, i.e., a charging direction or a discharging direction, due to the two-phase reaction as described above, and resistance values may also be different depending on charging rates.

The resistance value is not constant due to the structural property of the lithium titanium oxide, that is, the occlusion and release of lithium ions through a phase change between a spinel structure and a rock-salt structure.

In the case where a resistance value is not constant, when a lithium secondary battery to which a lithium titanium oxide is applied as a negative electrode active material is applied to a battery pack, prediction using a battery management system (BMS) becomes difficult, causing considerable complexity in a prediction algorithm.

However, when the negative electrode active material including the titanium-based composite according to the present invention is used, when the area ratio of the plane (400) and the plane (111) is 0.8 or more based on the results of an X-ray diffraction spectrum measured under C-rate conditions having a specific range, resistance values are constantly low regardless of the setting direction of SOC, charging speed, etc., thereby overcoming intrinsic resistance difference due to the structural characteristics of the lithium titanium oxide.

The lithium secondary battery according to the present invention, which is capable of overcoming the intrinsic resistance difference due to the structural characteristics, may have a resistance value change rate of 5% or less regardless of resistance measurement directions in a SOC range of 5 to 100 during charging and discharging.

As described above, as the area ratio is larger than 0.8, that is, as the area of the plane (400) is larger, a resistance value is more uniformly measured, indicating that a phase transition speed between a spinel structure and a rock-salt structure is faster. Therefore, according to the present invention, the lithium secondary battery may have excellent output characteristics, and the constant resistance value may provide an advantage of greatly simplifying a BMS prediction algorithm.

In the titanium-based composite according to the present invention, a structural stabilization may be associated with the well-developed plane (400). The titanium-based composite may include a lithium titanium oxide and may be represented by Formula 1 below.

$$Li_xTi_yO_z, \qquad \text{<Formula 1>}$$

in Formula 1, x, y and z satisfy 0.1≤x≤4, 1≤y≤5 and 2≤z≤12, respectively.

Specifically, a lithium titanium oxide represented by Formula 1 may be $Li_4Ti_5O_{12}$, $LiTi_2O_4$, $Li_2TiO_3$, or $Li_2Ti_3O_7$, which may cause a phase change between a spinel structure and a rock-salt structure during charging and discharging, but the lithium titanium oxide is not limited thereto.

The titanium-based composite may further include any one metal element selected from the group consisting of M1, Al (aluminum), and combinations thereof. The titanium-based composite may be doped or coated with the metal elements. Specifically, M1 in the metal elements may be at least one transition metal element selected from the group consisting of Zr and Nb.

In the present invention, M1 may be mostly used for doping, and Al may be partially used for doping and coating in a manufacturing process, without being limited thereto. Specifically, the titanium-based composite may be doped with M1, coated with Al, or doped and coated with Al; or doped with M1 and coated with Al or doped with M1 and doped and coated with Al.

According to the present invention, a titanium-based composite doped or coated with the metal elements is applied to the lithium titanium oxide as a negative electrode active material. A lithium secondary battery, to which the negative electrode active material is applied, has a small resistance change value depending on a SOC setting direction or a charging speed, thereby simplifying a BMS prediction algorithm. In addition, since the resistance value may be kept low, output characteristics may be excellent.

Specifically, to effectively obtain the above effect, the amount of the metal elements used in doping or coating is preferably 700 to 5000 ppm, 700 to 3000 ppm, or 1000 to 3000 ppm based on the weight of the titanium-based composite. When the amount of the metal elements used in doping or coating is adjusted to the above-mentioned range, it is possible to significantly reduce the variation range of resistance and to prepare a battery pack capable of simplifying a BMS prediction algorithm or a lithium secondary battery having excellent output characteristics.

More specifically, when the amount of doping or coating is less than 700 ppm, the amount of the metal elements that may contribute to the structural stabilization of a lithium titanium oxide is insufficient, and the possibility increases that the variation range of resistance values does not decrease. When the amount of doping or coating exceeds 5000 ppm, the amount of titanium is relatively reduced, and the output characteristics, which are the basic characteristics of the lithium titanium oxide, may be lowered somewhat, and the excess metal elements act as materials which interfere with the phase transition phenomenon of the lithium titanium oxide, so that the area of the crystal plane (400) may be relatively decreased, and the range of the resistance change may be increased again.

Considering the above aspect, a range in which an optimum effect may be obtained is about 700 to 5000 ppm, most preferably 700 to 3000 ppm, and it is preferable to prepare the titanium-based composite by adjusting to this range.

As described above, the coating layer of Al formed on the titanium-based composite further activates a phase transition between a spinel structure and a rock-salt structure, thereby promoting the development of the crystal plane (400). In addition, an intrinsic resistance variation width caused by the structural characteristics of the lithium titanium oxide may be overcome and an output performance may be greatly improved.

The primary particles of the titanium-based composite may have a particle diameter ($D_{50}$) of 1 μm or less, preferably 200 to 700 nm, and the particle diameter ($D_{50}$) of secondary particles may be different depending on the aggregation degree of the primary particles, but may be generally 1 to 10 μm. The particle size is satisfied when particles are normally prepared according to a manufacturing method described later, and may be suitable for application as an active material. In addition, when particles having the above-described range are used, aggregation of primary particles may be prevented, and an appropriate effect may be exhibited in connection with the porosity of a negative electrode prepared using the particles.

Negative Electrode Active Material for Secondary Battery

According to the present invention, provided is a negative electrode active material for a secondary battery, including a titanium-based composite containing a lithium titanium oxide represented by Formula 1 below; and metal elements doped or coated on the lithium titanium oxide, wherein the metal elements include any one selected from the group consisting of M1, Al, and combinations thereof, wherein M1 is at least one transition metal element selected from the group consisting of Zr and Nb.

$$Li_xTi_yO_z, \qquad \text{<Formula 1>}$$

in Formula 1, x, y and z satisfy 0.1≤x≤4, 1≤y≤5 and 2≤z≤12, respectively.

Description of the negative electrode active material for a secondary battery including the lithium titanium oxide, the metal elements, and the titanium-based composite was described in the description of the lithium secondary battery, and will be omitted.

Method of Preparing Negative Electrode Active Material Including Titanium-Based Composite According to the present invention, provided is a method of preparing a negative electrode active material for a secondary battery, the method including (a) a step of preparing a precursor mixture by mixing a lithium precursor and a titanium precursor; and (b) a step of heating the precursor mixture at a temperature of 800 to 1100° C., and further comprising at least one of (a-1) a step of further adding an M1 precursor to the precursor mixture; and (b-1)

a step of mixing the precursor mixture with an Al precursor and heating at a temperature of 300 to 500° C., after performing step (b).

In the method of preparing the negative electrode active material, a process may proceed in the order of step (a), step (a-1), and step (b), a process may proceed in the order of step (a), step (b), and step (b-1), and a process may proceed in the order of step (a), step (a-1), step (b), and step (b-1). By performing the three processes as described above, a titanium-based composite including a lithium titanium oxide coated and/or doped with M1 and/or Al may be prepared.

In step (a), the mixing of the precursors is a process for evenly mixing the lithium precursor and the titanium precursor as a whole. When the precursor mixture is uniformly mixed in a dried state, mixing methods are not particularly limited, and the mixing methods may include wet mixing methods and dry mixing methods.

The mixing may be performed by wet mixing methods. As a wet mixing method using a spray drying process, for example, a precursor solution is prepared by adding a lithium precursor and a titanium precursor to a volatile solvent, and the precursor solution is injected into a chamber equipped with spray drying equipment to evaporate volatile solvents. Through these processes, precursor mixture powders are prepared.

Specifically, in the preparation of the precursor solution, a solution prepared by dissolving a lithium precursor in a volatile solvent may be stirred while a titanium precursor is added. The volatile solvent used may be water such as deionized water or distilled water, acetone, or alcohol having a low carbon number such as methanol, ethanol, or propanol. There is no particular limitation in the case of solvents which may be easily evaporated by the heat applied during the spray drying.

The prepared precursor solution may be injected into a chamber equipped with spray drying equipment as described above, and the precursor solution may be sprayed and dried simultaneously by the spray drying equipment.

For example, the spray drying equipment may include ultrasonic spray drying equipment, air nozzle spray drying equipment, ultrasonic nozzle spray drying equipment, filter expansion droplet generating equipment, electrostatic spray drying equipment, or combinations thereof. The temperature in the chamber during spray drying is preferably 20 to 300° C. When the temperature exceeds 300° C., intergranular aggregation or particle growth of the precursor mixed powder may occur. Thus, it is necessary to adjust temperature appropriately.

The mixing may be performed by dry mixing methods. In the dry mixing methods, the lithium precursor and the titanium precursor may be mixed by mechanical methods. For example, a ball mill, a high-speed rotary mill, a stirring mill, a jet mill, or combination thereof may be used in the mechanical methods.

As the lithium precursor, source materials capable of providing lithium such as a lithium salt combined with lithium ions may be used without any particular limitation. For example, the lithium precursors may include $Li_2CO_3$, LiOH, LiF, $Li_2SO_4$, $LiNO_3$, LiCl, or mixtures thereof.

In addition, as the titanium precursor, source materials capable of providing titanium such as a titanium oxide may be used without any particular limitation, and the form thereof may be a hydrate and dry powders. However, in the case of a hydrate, it is preferable to mix the titanium precursor with the lithium precursor using a wet mixing method, and in the case of dry powders, a dry mixing method is preferably used. For example, $TiO_2$, $TiCl_4$, $TiOCl_2$, $TiOSO_4$, $TiO(OH)_2$, or mixtures thereof may be used as the titanium precursor.

In step (a-1), M1 is doped on the lithium titanium oxide, and the M1 precursor may be added when the lithium precursor and the titanium precursor are mixed. The mixing of the M1 precursor may be performed at about 0.02 to 0.2% by weight based on the total weight of the precursor mixture. In the above range, the degree of development of the crystal plane (400) may be excellent, and the area ratio may be 0.8 or more. The mixing of the M1 precursor may be performed selectively, and may be performed simultaneously with step (b-1) described below, or in only one of the two steps.

The M1 precursor may be any one oxide or hydroxide selected from the group consisting of Zr and Nb, and the oxide or hydroxide is used alone or in combination.

Step (b) may be a step of heating the precursor mixture, and may be a step of preparing the titanium-based composite material by mixing in any manner and then heat-treating the dried precursor mixture powder, and may be a calcination process.

In step (b), it may be necessary to appropriately adjust a heat treatment temperature and heat treatment time. For performance and safety of the battery, it is necessary to minimize the amount of unreacted lithium precursor, titanium precursor, or M1 precursor. It is necessary to control calcination conditions so as to prevent by-products such as lithium salts produced by side reactions.

The heat treatment may be performed at a temperature of about 800 to 1100° C., and is preferably performed at a temperature of about 850 to 1050° C., or 900 to 1000° C.

When the heat treatment temperature is lower than 800° C. and sufficient heat may not be supplied, an unreacted lithium precursor or lithium salts such as lithium compounds due to side reactions may remain in the titanium-based composite. When such impurities remain in a large amount, the storage performance or output characteristics of a battery may be affected by side reactions or gas generation. When the heat treatment temperature is higher than 1100° C. and excessive energy is supplied, a lithium titanium oxide may be denatured, or particle growth may occur, which may affect the output characteristics of a battery. Therefore, it is necessary to appropriately adjust the heat treatment temperature.

It is necessary to control the heat treatment time. In the case of the present invention, heat treatment is preferably performed for about 2 to 12 hours. When the heat treatment is performed for less than 2 hours, the same disadvantages as in the case of performing the heat treatment at lower temperatures may occur. When the heat treatment is performed for more than 12 hours, energy waste or process cost may increase.

The titanium-based composite prepared according to the heat treatment may include a lithium titanium oxide, and the lithium titanium oxide may be doped or coated with M1. In this case, since M1 is mixed with the precursors of lithium and titanium and calcined by heat-treated, most of M1 may be present in the lithium titanium oxide in the form of doping, but in some cases may exist on the surface of the oxide in the form of coating.

Also, after the heat treatment is performed in step (b), the titanium-based composite may be subjected to a second heat treatment in a state where an Al precursor is mixed. The heat treatment at this time may be performed at about 300 to 500° C. When the heat treatment is performed in this manner, the surface of the titanium-based composite may be coated with Al, or the interior of the titanium-based composite may be doped with Al.

By performing the heat treatment in the temperature range described above, Al may form an intact coating layer. When the heat treatment temperature is close to 500° C., Al may be present in the titanium-based composite in a doped form, and when the heat treatment temperature is close to 300° C., Al may exist in a coated form. When the heat treatment temperature exceeds 500° C., ancillary changes other than Al doping or coating such as grain coarsening may occur. When the heat treatment temperature is lower than 300° C., Al coating may not be formed.

An Al precursor used at this time may be an oxide or hydroxide of Al, and the oxide or hydroxide may be used alone or in combination.

The titanium-based composite finally prepared may include a lithium titanium oxide doped and/or coated with metal elements (M1 and/or Al). The final amount of the metal elements present in the lithium titanium oxide may be 700 to 3000 ppm based on the total amount of the titanium-based composite. In the case of the content in this range, as described above, the development of the crystal plane (400) may be excellent, and the area ratio of the crystal plane (400) and the crystal plane (111) is increased due to the excellent development of the crystal plane (400). Accordingly, the stability of the change in resistance and improvement of output performance may be obtained.

As described above, according to the titanium-based composite of the present invention, the lithium titanium oxide may be doped or coated with metal elements, and further, a coating layer containing Al may be formed on the surface of the titanium-based composite. Such a coating layer may be formed by applying a ball milling method to the Al precursor and the titanium-based composite, and additional heat treatment may be performed, and methods generally used for forming a coating layer may be used without any particular limitation.

Positive Electrode

The lithium secondary battery of the present invention may be prepared by a conventional method known in the art. For example, a porous separator may be interposed between a positive electrode and a negative electrode, and an electrolyte in which a lithium salt is dissolved may be added.

The positive electrode may be prepared by a conventional method known in the art. For example, to prepare a positive electrode, a slurry is prepared by mixing a solvent, a binder (when necessary), a conductive agent, and a dispersant with a positive electrode active material, and the slurry is stirred and is applied (coated) to the current collector of a metal material, followed by compression and drying.

The positive electrode is prepared by applying a positive electrode active material onto a positive electrode current collector and then drying. At this time, a lithium-containing transition metal oxide is preferably used as the positive electrode active material. For example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3) or a mixture of two or more thereof may be used as the positive electrode active material. The lithium-containing transition metal oxide may be coated with metal such as aluminum (Al) or a metal oxide. In addition to the lithium-containing transition metal oxide, a sulfide, a selenide, a halide, and the like may be used.

More preferably, a material such as $Li_xCoO_2$ (0.5<x<1.3) or $Li_xMn_{2-z}Ni_zO_4$ (0.5<x<1.3, 0<z<2) is used as the positive electrode active material.

In general, the positive electrode current collector is prepared to have a thickness of 3 to 500 μm. Such a positive electrode current collector is not particularly limited as long as the positive electrode current collector has electrical conductivity without causing a chemical change in the battery. As a metal having high conductivity, any metal may be used as long as the slurry of the positive electrode active material may be easily adhered to the metal and the metal is not reactive in the voltage range of the battery. Non-limiting examples of the positive electrode current collector include foil prepared using aluminum, nickel, or a combination thereof.

Examples of solvents for forming the positive electrode include organic solvents such as N-methyl pyrrolidone (NMP), dimethylformamide (DMF), acetone, dimethylacetamide, and the like or water. These solvents may be used alone or in combination of two or more.

The amount of the solvent used is sufficient to dissolve and disperse the electrode active material, the binder, and the conductive agent in consideration of the coating thickness of the slurry and production yield.

A conductive material may be used without limitation as long as the conductive material is generally usable in the art. For example, artificial graphite, natural graphite, carbon black, acetylene black, ketjen black, denka black, thermal black, channel black, carbon fiber, metal fiber, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, or mixtures thereof may be used as the conductive material.

A binder may be used without limitation as long as the binder is generally used in the art. For example, polyvinylidene fluoride (PVDF), polyhexafluoropropylene-polyvinylidene fluoride copolymer (PVDF/HFP), poly (vinylacetate), polyvinylalcohol, polyethyleneoxide, polyvinylpyrrolidone, polyvinylpyridine, alkylated polyethyleneoxide, polyvinylether, poly (methylmethacrylate), poly (ethylacrylate), polytetrafluoroethylene (PTFE), polyvinylchloride, polyacrylonitrile, styrene-butadiene rubber, acrylonitrile-butadiene rubber, fluorane rubber, ethylene-propylene-diene monomer (EPDM) sulfonated ethylenepropylene-diene monomer, carboxymethylcellulose (CMC), regenerated cellulose, starch, hydroxypropylcellulose, tetrafluoroethylene, or mixtures thereof may be used as the binder.

In preparation of the positive electrode, a filler may be further added to the mixture, when necessary. The filler is optionally used as a component for suppressing the expansion of the positive electrode, and is not particularly limited as long as the filler is a fibrous material that does not cause chemical change in the battery. For example, olefine-based polymers such as polyethylene and polypropylene; fibrous materials such as glass fiber and carbon fiber may be used as the filler.

Negative Electrode

A negative electrode is prepared by applying and drying a negative electrode active material including a titanium-based composite as described above on a negative electrode current collector, and may further include the above-described components as needed.

The negative electrode includes the above-described titanium-based composite as a negative electrode active material. At this time, the primary particles of the titanium-based composite may have an average particle diameter ($D_{50}$) of about 1 μm or less, and the specific surface area of the negative electrode prepared using the negative electrode active material, according to a BET method, may be about 3 to 50 m$^2$/g. In order that the specific surface area of the negative electrode satisfies the above range, the specific surface area of the negative electrode active material may be about 1 to 10 m$^2$/g, and an upper limit is preferably 6 m$^2$/g or less, without being limited thereto. It is preferable to control the specific surface area value of a conductive material to also control the specific surface area of the finally prepared negative electrode to be in a range of 3 to 50 m$^2$/g.

When the specific surface area of the negative electrode is less than 3 m$^2$/g, affinity between the negative electrode and the electrolyte is lowered and so the interface resistance of the negative electrode may increase, which causes a deterioration of output characteristics. When the specific surface area is more than 50 m$^2$/g, an electrolyte may be biased toward a negative electrode, and the electrolyte may be insufficient at a positive electrode, which makes it difficult to improve the output characteristics.

The description of the conductive material and the binder is the same as that described in the description of the positive electrode, and the description thereof will be omitted.

In general, the negative electrode current collector is prepared to have a thickness of 3 to 500 μm. Such a negative electrode current collector is not particularly limited as long as the negative electrode current collector has electrical conductivity without causing a chemical change in the battery. For example, copper, stainless steel, aluminum, nickel, titanium, calcined carbon, copper or stainless steel of which the surface is treated with carbon, nickel, titanium, silver, etc., or aluminum-cadmium alloy may be used.

In addition, like the positive electrode collector, fine unevenness may be formed on the surface of the negative electrode current collector to enhance the bonding force of the negative electrode active material, and the negative electrode current collector may be used in various forms such as films, sheets, foil, nets, porous bodies, foams and nonwoven fabrics.

Separator

As a separator for insulating electrodes between the positive electrode and the negative electrode, porous polymer films conventionally used as a separator, which are prepared using polyolefin-based polymers such as an ethylene homopolymer, a propylene homopolymer, an ethylene/butene copolymer, an ethylene/hexene copolymer, an ethylene/methacrylate copolymer, and the like, may be used alone or in a laminated form, or nonwoven fabrics made of conventional porous nonwoven fabrics, for example, glass fibers having a high melting point, polyethyleneterephthalate fibers, or the like may be used, without being limited thereto.

Electrolyte

An electrode current collector having the above structure is housed in a pouch case, and then an electrolyte is injected to prepare a battery.

The electrolyte is a lithium salt-containing non-aqueous electrolyte, and composed of a non-aqueous electrolyte and lithium. Non-aqueous electrolytes, solid electrolytes, inorganic solid electrolytes, and the like may be used as the non-aqueous electrolyte.

For example, aprotic organic solvents, such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy-furan, 2-methyl tetrahydrofuran, dimethylsulfoxide, 1,3-dioxolane, formamide, dimethylformamide, dioxolane, acetonitrile, nitromethane, formic acid methyl, acetic acid methyl, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, pyrophosphoric acid methyl, and propionic acid ethyl, may be used as the non-aqueous electrolyte.

As the organic solid electrolytes, polyethylene derivatives, polyethylene oxide derivatives, polypropylene oxide derivatives, phosphoric acid ester polymers, poly agitation lysine, polyester sulfides, polyvinylalcohol, polyvinylidene fluoride, polymers containing ionic dissociation groups, and the like may be used.

As the inorganic solid electrolytes, nitrides of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, halides, sulfates, and the like may be used.

The lithium salt is a substance which is soluble in the non-aqueous electrolyte. For example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, 4-phenyl boric acid lithium, imide, and the like may be used.

In addition, to improve charge/discharge characteristics and flame resistance, pyridine, triethylphosphite, triethanolamine, cyclic ether, ethylene diamine, n-glyme, hexa phosphoric acid triamide, nitrobenzene derivatives, sulfur, quinoneimine dye, N-substituted oxazolidinone, N,N-substituted imidazolidine, ethylene glycol dialkyl ether, ammonium salt, pyrrole, 2-methoxy ethanol, aluminum trichloride, and the like may be added to the non-aqueous electrolyte. In some cases, the non-aqueous electrolyte may further include a halogen-containing solvent such as carbon tetrachloride, ethylene trifluoride or the like to impart incombustability, or may further include a carbon dioxide gas to improve high-temperature storage characteristics.

Applied Product

The battery module according to another embodiment of the present invention includes the above-described lithium secondary battery as a unit battery, and the battery pack according to another embodiment of the present invention includes the battery module.

According to the present invention, by using the titanium-based composite as a negative electrode active material, the battery pack has small variation in the resistance value of the secondary battery according to a setting direction or a charging rate during SOC setting, which may significantly simplify a BMS prediction algorithm. Furthermore, since the constant resistance value is maintained at a low value, the output characteristic may also be improved.

A battery case used in the present invention may be a case commonly used in the art. There is no limitation on the external shape depending on the use of the battery, and for example, the shape may be a cylindrical type using a can, a prismatic type, a pouch type, a coin type, or the like.

The lithium secondary battery according to the present invention may be used in a battery module used as a power source for a small sized device. In addition, the lithium secondary battery may be preferably used as a unit battery in a medium to large sized battery pack including a plurality of batteries. Preferable examples of medium to large sized devices may include electric vehicles, hybrid electric vehicles, plug-in hybrid electric vehicles, electric power storage systems, and the like, without being limited thereto.

The invention claimed is:

1. A negative electrode active material for a secondary battery, comprising a titanium-based composite containing:
   a lithium titanium oxide represented by Formula 1 below; and
   metal elements doped and coated to the lithium titanium oxide,
   wherein the titanium-based composite is doped with M1 and coated with Al; or doped with M1 and doped and coated with Al,
   wherein the metal elements comprise M1 and Al, wherein M1 is at least one transition metal element selected from the group consisting of Zr and Nb, $Li_xTi_yO_z$, <Formula 1> in Formula 1, x, y and z satisfy $0.1 \leq x \leq 4$, $1 \leq y \leq 5$ and $2 \leq z \leq 12$, respectively.

2. The negative electrode active material according to claim 1, wherein a content of the metal elements is 700 to 5000 ppm based on a total weight of the titanium-based composite.

3. The negative electrode active material according to claim 1, wherein primary particles of the titanium-based composite have a particle diameter ($D_{50}$) of 1 µm or less.

4. The negative electrode active material according to claim 1, wherein secondary particles of the titanium-based composite have a particle diameter ($D_{50}$) of 0.5 to 2.0 µm.

5. A method of preparing a negative electrode active material for a secondary battery, the method comprising:
   (a) a step of preparing a precursor mixture by mixing a lithium precursor and a titanium precursor; and (b) a step of heating the precursor mixture at a temperature of 800 to 1100° C., and
   further comprising:
   (a-1) a step of further adding an M1 precursor to the precursor mixture; and
   (b-1) a step of mixing the precursor mixture with an Al precursor and heating at a temperature of 300 to 500° C., after performing step (b),
   wherein the negative electrode active material comprises titanium-based composite which is doped with M1 and coated with Al; or doped with M1 and doped and coated with Al,
   wherein M1 is at least one transition metal element selected from the group consisting of Zr and Nb.

6. The method according to claim 5, wherein the lithium precursor comprises any one selected from the group consisting of $Li_2CO_3$, LiOH, LiF, $Li_2SO_4$, $LiNO_3$, LiCl and combinations thereof.

7. The method according to claim 5, wherein the titanium precursor comprises any one selected from the group consisting of $TiO_2$, $TiCl_4$, $TiOCl_2$, $TiOSO_4$, TiO(OH)$_2$ and combinations thereof.

8. The method according to claim 5, wherein the M1 precursor is at least one oxide or hydroxide selected from the group consisting of Zr and Nb, wherein the oxide or hydroxide is used alone or in combination.

9. The method according to claim 5, wherein the Al precursor is an oxide or hydroxide of Al, wherein the oxide or hydroxide is used alone or in combination.

10. A lithium secondary battery, comprising a positive electrode comprising a positive electrode active material, a negative electrode comprising a negative electrode active material of claim 1, and a separator provided between the positive electrode and the negative electrode, wherein
    the negative electrode active material comprises a titanium-based composite, wherein, when the lithium secondary battery is charged to SOC 50 under C-rate conditions of 0.1 to 40 C, the titanium-based composite has a ratio of a peak area of a plane (400) and a peak area of a plane (111) of 0.76 or more in a measured X-ray diffraction spectrum (XRD).

11. The lithium secondary battery according to claim 10, wherein the negative electrode active material comprises the titanium-based composite, wherein, when the lithium secondary battery is charged to SOC 50 under C-rate conditions of 0.1 to 10 C, the titanium-based composite has a ratio of a peak area of the plane (400) and a peak area of the plane (111) of 0.80 or more in a measured X-ray diffraction spectrum (XRD).

12. The lithium secondary battery according to claim 10, wherein the lithium secondary battery has a resistance value change rate of 10% or less regardless of resistance measurement directions in a SOC range of 5 to 100 during charging and discharging.

13. A lithium secondary battery, comprising:
    a positive electrode comprising a positive electrode active material; and a negative electrode comprising the negative electrode active material of claim 1, wherein
    primary particles of the titanium-based composite have an average particle diameter ($D_{50}$) of 1 µm or less, and a specific surface area of the negative electrode according to a BET method is 3 to 50 m$^2$/g.

14. The lithium secondary battery according to claim 13, wherein the positive electrode active material is any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, a+b+c=1), $Li_xNi_{1-y}Co_yO_2$ ($0.5<x<1.3$, $0<y<1$), $Li_xCo_{1-y}Mn_yO_2$ ($0.5<x<1.3$, $0 \leq y<1$), $Li_xNi_{1-y}Mn_yO_2$ ($0.5<x<1.3$, $O \leq y<1$), $Li_x(Ni_aCo_bMn_c)O_4$ ($0.5<x<1.3$, $0<a<2$, $0<b<2$, $0<c<2$, a+b+c=2), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), and $Li_xFePO_4$ ($0.5<x<1.3$) or a mixture of two or more thereof.

* * * * *